(12) United States Patent
Price et al.

(10) Patent No.: US 10,209,360 B2
(45) Date of Patent: Feb. 19, 2019

(54) REDUCED PHASE SAMPLING FOR HIGH SPEED DEPTH SENSING

(71) Applicant: Microsoft Technology Licensing, LLC, Redmond, WA (US)

(72) Inventors: Raymond Kirk Price, Redmond, WA (US); Michael Bleyer, Seattle, WA (US); Denis Demandolx, Bellevue, WA (US); Jian Zhao, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/422,428

(22) Filed: Feb. 1, 2017

(65) Prior Publication Data
US 2018/0217260 A1    Aug. 2, 2018

(51) Int. Cl.

| | | |
|---|---|---|
| *G01S 17/36* | (2006.01) | |
| *G06T 7/521* | (2017.01) | |
| *G06T 5/00* | (2006.01) | |
| *G06F 3/01* | (2006.01) | |
| *H04N 5/232* | (2006.01) | |
| *G02B 27/01* | (2006.01) | |
| *G01S 17/89* | (2006.01) | |
| *G01S 17/32* | (2006.01) | |
| *G01S 7/48* | (2006.01) | |

(52) U.S. Cl.
CPC ............ *G01S 17/36* (2013.01); *G01S 7/4808* (2013.01); *G01S 17/325* (2013.01); *G01S 17/89* (2013.01); *G02B 27/0172* (2013.01); *G06F 3/011* (2013.01); *G06T 5/003* (2013.01); *G06T 7/521* (2017.01); *H04N 5/23241* (2013.01); *G02B 2027/014* (2013.01); *G02B 2027/0138* (2013.01); *G06T 2207/10028* (2013.01); *G06T 2207/10048* (2013.01); *G06T 2207/30196* (2013.01)

(58) Field of Classification Search
CPC .............................. G01S 17/36; G06T 7/521
See application file for complete search history.

(56) References Cited

U.S. PATENT DOCUMENTS

| | | | |
|---|---|---|---|
| 8,587,771 | B2 | 11/2013 | Xu et al. |
| 8,587,773 | B2 | 11/2013 | Bamji et al. |
| 2008/0151391 | A1 | 6/2008 | Zalevsky et al. |
| 2011/0051119 | A1 | 3/2011 | Min et al. |
| 2011/0292370 | A1 | 12/2011 | Hills et al. |

(Continued)

FOREIGN PATENT DOCUMENTS

| | | |
|---|---|---|
| CN | 102622745 A | 8/2012 |
| EP | 2594959 A1 | 5/2013 |

OTHER PUBLICATIONS

Tian, et al., "3D intensity and phase imaging from light field measurements in an LED array microscope", In Journal of Optica, vol. 2, Issue 2, Jan. 28, 2015, pp. 104-111.

(Continued)

*Primary Examiner* — Hugh H Maupin
(74) *Attorney, Agent, or Firm* — Arent Fox LLP

(57) ABSTRACT

Disclosed is a technique to use only two phase captures per frequency capture to perform calculations to generate a depth frame (i.e. a total of 4 captures/depth frame). By using only two phase captures, a depth sensing system can reduce power consumption in the phase-ToF sensor, system memory bandwidth, and processor computation.

18 Claims, 10 Drawing Sheets

(56) References Cited

U.S. PATENT DOCUMENTS

| | | | |
|---|---|---|---|
| 2012/0176476 A1 | 7/2012 | Schmidt et al. | |
| 2013/0141421 A1* | 6/2013 | Mount | H04N 21/41407 345/419 |
| 2014/0168369 A1 | 6/2014 | Crane et al. | |
| 2014/0313376 A1* | 10/2014 | Van Nieuwenhove | G01S 17/89 348/241 |
| 2014/0327741 A1* | 11/2014 | Fleischmann | G01S 17/36 348/46 |
| 2014/0333728 A1* | 11/2014 | Navab | G01S 7/497 348/47 |
| 2014/0368728 A1 | 12/2014 | Raskar et al. | |
| 2016/0180574 A1* | 6/2016 | Kaminitz | G06T 11/60 345/633 |
| 2017/0134717 A1* | 5/2017 | Trail | G06T 19/006 |

OTHER PUBLICATIONS

Gupta, et al., "Phasor Imaging: A Generalization of Correlation-Based Time-of-Flight Imaging", In ACM Transactions on Graphics, vol. 34, Issue 5, Oct. 2015, 18 pages.

Li, Larry, "Time-of-Flight Camera—An Introduction", In Technical White Paper, Jan. 2014, pp. 1-10.

Kadambi, et al., "Macroscopic Interferometry: Rethinking Depth Estimation with Frequency-Domain Time-of-Flight", The IEEE Conference on Computer Vision and Pattern Recognition (CVPR), Jun. 2016, 10 pages.

* cited by examiner

REDUCED PHASE SAMPLING FOR HIGH SPEED DEPTH SENSING

TECHNICAL FIELD

This disclosure relates to machine vision. More particularly, this disclosure relates to power consumption associated with depth tracking in machine vision.

BACKGROUND

Depth sensing technology can be used to determine a person's location in relation to nearby objects or to generate an image of a person's immediate environment in three dimensions (3D). An example of depth sensing technology is a time-of-flight (ToF) depth camera. A ToF camera has a light source to emit light onto nearby objects. Light reflected off surfaces of the objects can be captured by the ToF camera. The time it takes for the light to travel from the light source of the ToF camera and reflect back from an object is converted into a depth measurement (i.e., distance to the object), which can be processed to map physical surfaces in the user's environment and, if desired, to render a 3D image of the user's environment. Another example of ToF based depth sensing technology is based on phase delay calculations. Emitting light at one or more known frequencies and comparing the phase of received reflected light with that of the emitted light enables a calculated phase delay. Knowing one or more phase delays of the reflected light enables a processor to determine the distance to the object from which the light was reflected.

Depth cameras and their associated illumination systems require power to operate. In mobile devices, there are often strict constraints on power consumption, as well as size, weight and cost. Where more frequent emissions from an illumination module are used, the power consumption increases. This issue is present in a number of devices such as depth sensing devices, active infrared (IR) modules, night vision cameras, security cameras, and other applications of machine vision. The frequency of the illumination of these systems is typically chosen to meet desired levels of accuracy at a given moment. Higher frame rates provide higher certainty for the current location of objects within view of the depth sensor. Higher certainty of the depth sensor improves device performance. A device designed to provide active illumination at a high frame rate tends to require a power source (e.g., one or more batteries) with more capacity, and therefore more size and weight, than a device that uses a lower frame rate, thereby undesirably adding to the size, weight and cost of the end product.

SUMMARY

Introduced here is an electromagnetic radiation (EM) emitter that transmits at two different frequencies and a phase-ToF sensor. Further disclosed is a phase ToF depth sensor that measures return radiation from reflected radiation of the EM emitter. The frequency of the return (reflected) radiation is measured at two or more phases during each frame to determine the distance from the device to nearby objects. The phase calculations resulting from the alternating frequencies of the reflected radiation are used to de-alias depth calculations. Each frequency is emitted individually during every other frame of the depth sensor. The combination of the two frequencies produces the full intended frame rate for depth detection. Alternating between the two frequencies rather than using both frequencies during each frame, and correlating each return radiation to only two phases, reduces power consumption associated with depth sensing.

In some embodiments, the method can comprise transmitting particular electromagnetic radiation, detecting the return radiation (reflected from an object), and performing calculations based on the return radiation to determine the depth of (distance to) the object relative to the transmitting device. The method further includes correlating the returned radiation with a reference waveform at each of only two sampling phases that are not 180 degrees apart. Then, the depth sensing system determines a phase of the returned radiation based on a result of the correlating. With the determined phase, the depth sensing system determines the distance to the object.

Other aspects of the disclosed embodiments will be apparent from the accompanying figures and detailed description.

This Summary is provided to introduce a selection of concepts in a simplified form that are further explained below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
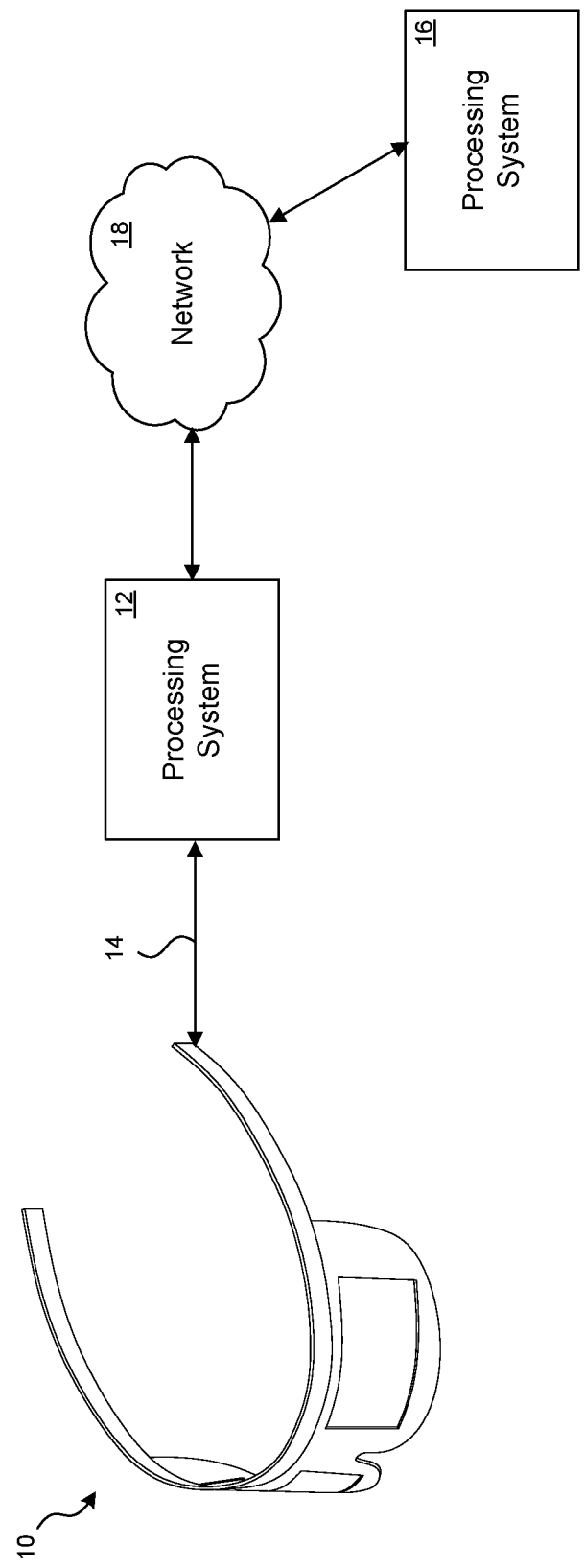
FIG. 1 shows an example of an environment in which a virtual reality (VR) or augmented reality (AR) enabled head-mounted display device (hereinafter "HMD device") can be used.

In this description, references to "an embodiment," "one embodiment" or the like mean that the particular feature, function, structure or characteristic being described is included in at least one embodiment introduced here. Occurrences of such phrases in this specification do not necessarily all refer to the same embodiment. On the other hand, the embodiments referred to also are not necessarily mutually exclusive.

The figures and related text describe certain embodiments of an illumination module suitable for use in near-to-eye display (NED) systems. However, the disclosed embodiments are not limited to NED systems and have a variety of possible applications, including any active illumination systems (i.e., actively using light sources) such as used in active light projection systems or any active camera modules. All such applications, improvements, or modifications are considered within the scope of the concepts disclosed here.

The following description generally assumes that a "user" of a display device is a human. Note, however, that a display device of the disclosed embodiments can potentially be used by a user that is not human, such as a machine or an animal. Hence, the term "user" can refer to any of those possibilities, except as may be otherwise stated or evident from the context. Further, the term "optical receptor" is used here as a general term to refer to a human eye, an animal eye, or a machine-implemented optical sensor designed to detect an image in a manner analogous to a human eye.

Virtual reality (VR) or augmented reality (AR) enabled head-mounted display (HMD) devices and other NED systems may include transparent display elements that enable users to see concurrently both the real world around them and AR content displayed by the HMD devices. An HMD device may include components such as light-emission elements (e.g., light emitting diodes (LEDs)), waveguides, various types of sensors, and processing electronics. HMD devices may further include one or more imager devices to generate images (e.g., stereo pair images for 3D vision) in accordance with the environment of a user wearing the HMD device, based on measurements and calculations determined from the components included in the HMD device.

An HMD device may also include a depth sensing system that resolves distance between the HMD device worn by a user and physical surfaces of objects in the user's immediate vicinity (e.g., walls, furniture, people and other objects). The depth sensing system may include a ToF depth camera (e.g., a phase ToF depth camera) that is used to produce a 3D image of the user's nearby real-world environment. The captured image has pixel values corresponding to the distance between the HMD device and points of the real-world environment.

The HMD device may have an imager device that generates holographic images based on the resolved distances, for example, so that holographic objects appear at specific locations relative to physical objects in the user's environment. The HMD device may also have one or more display devices to display the generated images overlaid on the view of an optical receptor of a user when the HMD device is worn by the user. Specifically, one or more transparent waveguides of the HMD device can be arranged so that they are positioned to be located directly in front of each eye of the user when the HMD device is worn by the user, to emit light representing the generated images into the eyes of the user. With such a configuration, images generated by the HMD device can be overlaid on the user's three-dimensional view of the real world.

FIG. 1 schematically shows an example of an environment in which an HMD device can be used, where such HMD can implement the active illumination techniques introduced here. In the illustrated example, the HMD device 10 is configured to communicate data to and from an external processing system 12 through a connection 14, which can be a wired connection, a wireless connection, or a combination thereof. In other use cases, however, the HMD device 10 may operate as a standalone device. The connection 14 can be configured to carry any kind of data, such as image data (e.g., still images and/or full-motion video, including 2D and 3D images), audio, multimedia, voice, and/or any other type(s) of data. The processing system 12 may be, for example, a game console, personal computer, tablet computer, smartphone, or other type of processing device. The connection 14 can be, for example, a universal serial bus (USB) connection, Wi-Fi connection, Bluetooth or Bluetooth Low Energy (BLE) connection, Ethernet connection, cable connection, digital subscriber line (DSL) connection, cellular connection (e.g., 3G, LTE/4G or 5G), or the like, or a combination thereof. Additionally, the processing system 12 may communicate with one or more other processing systems 16 via a network 18, which may be or include, for example, a local area network (LAN), a wide area network (WAN), an intranet, a metropolitan area network (MAN), the global Internet, or combinations thereof.

Figure 2:
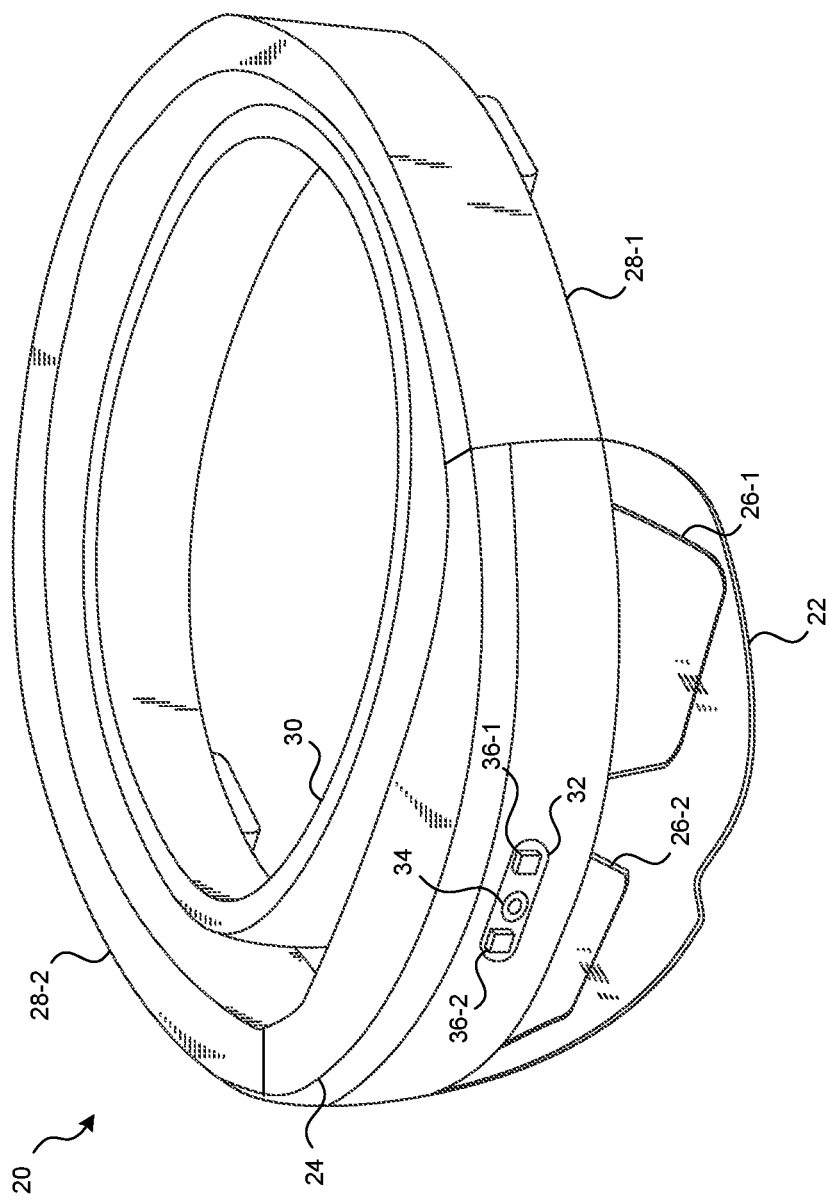
FIG. 2 illustrates a perspective view of an example of an HMD device.

FIG. 2 shows a perspective view of an HMD device 20 that can incorporate the features being introduced here, according to certain embodiments. The HMD device 20 can be an embodiment of the HMD device 10 of FIG. 1. The HMD device 20 has a protective sealed visor assembly 22 (hereafter the "visor assembly 22") that includes a chassis 24. The chassis 24 is the structural component by which display elements, optics, sensors and electronics are coupled to the rest of the HMD device 20. The chassis 24 can be formed of molded plastic, lightweight metal alloy, or polymer, for example.

The visor assembly 22 includes left and right AR displays 26-1 and 26-2, respectively. The AR displays 26-1 and 26-2 are configured to display images overlaid on the user's view of the real-world environment, for example, by projecting light into the user's eyes. Left and right side arms 28-1 and 28-2, respectively, are structures that attach to the chassis 24 at the left and right open ends of the chassis 24, respectively, via flexible or rigid fastening mechanisms (including one or more clamps, hinges, etc.). The HMD device 20 includes an adjustable headband (or other type of head fitting) 30, attached to the side arms 28-1 and 28-2, by which the HMD device 20 can be worn on the user's head.

The chassis 24 may include various fixtures (e.g., screw holes, raised flat surfaces, etc.) to which a sensor assembly 32 and other components can be attached. In some embodiments the sensor assembly 32 is contained within the visor assembly 22 and mounted to an interior surface of the chassis 24 via a lightweight metal frame (not shown). A circuit board (not shown in FIG. 2) bearing electronics components of the HMD 20 (e.g., microprocessor, memory) can also be mounted to the chassis 24 within the visor assembly 22.

The sensor assembly 32 includes a depth camera 34 and one or more associated illumination modules 36 (collectively referred to as illumination modules 36 and individually as illumination module 36-1 through 36-N) of a depth sensing system. The illumination modules 36 emit light to illuminate a nearby real-world environment. Some of the light reflects off surfaces of objects in the environment, and returns back to the depth camera 34. The depth camera 34 captures the reflected light that includes at least a portion of the light from the illumination modules 36. The depth camera may be configured to observe at multiple fields of view for different depth ranges. For a depth range configured to observe a user's hands, a field of view for the depth camera may include a 120 degree cone emanating from the depth camera.

The "light" emitted from the illumination modules 36 is electromagnetic radiation suitable for depth sensing and should not interfere with the user's view of the real world. As such, the light emitted from the illumination modules 36 is typically not part of the visible spectrum. Examples of the emitted light include infrared (IR) light to make the illumination unobtrusive. Sources of the light emitted by the illumination modules 36 may include LEDs such as superluminescent LEDs, laser diodes, or any other semiconductor-based light source with sufficient power output.

The depth camera 34 may be or include any image sensor configured to capture light emitted by the illumination modules 36. The depth camera 34 may include a lens that gathers reflected light and images the environment onto the image sensor. An optical bandpass filter may be used to pass only the light with the same wavelength as the light emitted by the illumination modules 36. For example, in a gated ToF depth sensing system, each pixel of the depth camera 34 may represent a measure of the time light has taken to travel from the illumination modules 36 to surfaces of objects and back to the depth camera 34. In contrast, in a phase delay ToF depth sensing system, each pixel of the depth camera 34 may be used to measure a phase delay of reflected light relative to the phase of light emitted from the illumination modules 36. Any of various approaches known to persons skilled in the art could be used for determining the timing, phases, phase delays, and corresponding depth calculations.

The HMD device 20 includes electronics circuitry (not shown in FIG. 2) to control and synchronize the operations of the depth camera 34 and the illumination modules 36, and to perform associated data processing functions. The circuitry may include, for example, one or more processors and one or more memories. As a result, the HMD device 20 can provide surface reconstruction to model the user's environment, or be used as a sensor to receive human interaction information, such as hand-tracking information. With such a configuration, images generated by the HMD device 20 can be properly overlaid on the user's 3D view of the real world to provide a virtual or augmented reality. Note that in other embodiments the aforementioned components may be located in different locations on the HMD device 20. Additionally, some embodiments may omit some of the aforementioned components and/or may include additional components not discussed above nor shown in FIG. 2.

Figure 3:
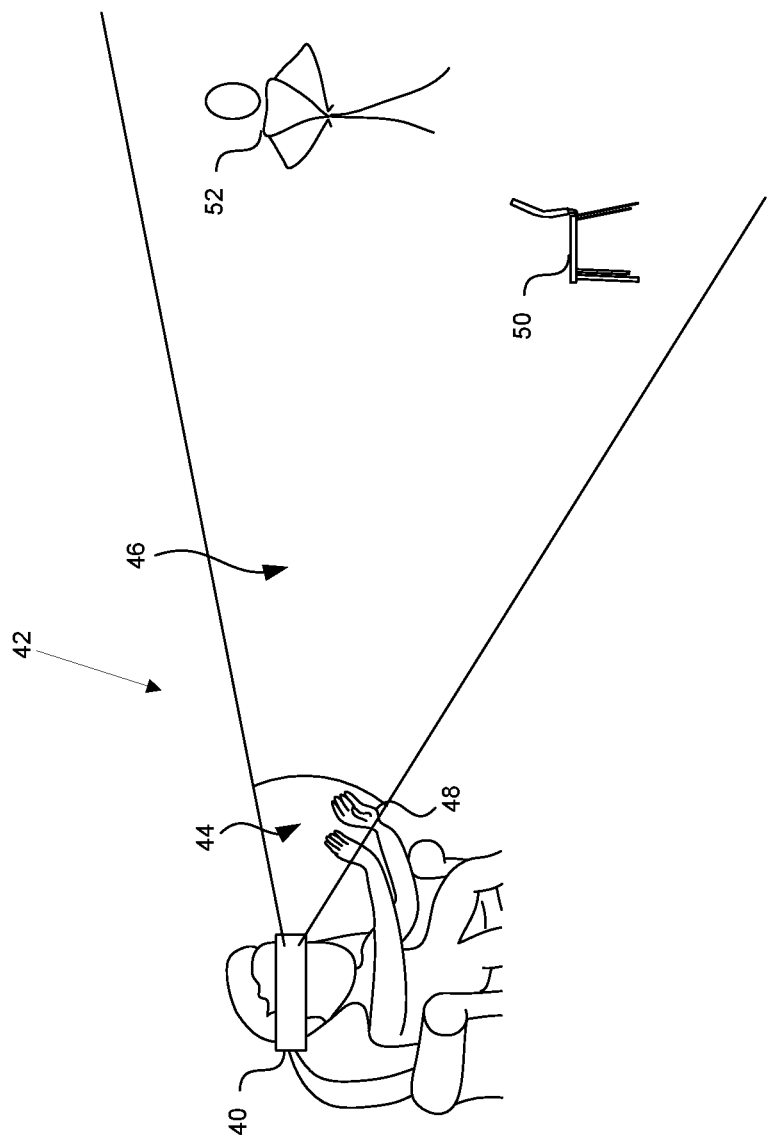
FIG. 3 illustrates depth mapping at two ranges concurrently.

FIG. 3 illustrates depth of environment mapping at two ranges concurrently. An HMD device 40 has a field of illumination 42 generated by the illumination module. The illumination module emits EM radiation that reflects off objects within a nearby real-world environment and the return radiation is captured by the depth camera on the HMD device 40.

The field of illumination 42 may include objects that provide context to generate ranges to vary illumination power and/or illumination frequency. FIG. 3 particularly illustrates a range or depth based context for generating variation in illumination power or illumination frequency.

The field of illumination 42 includes a first depth range 44 and a second depth range 46. The first depth range 44 is configured to include the space immediately proximate to the user, including the user's hands 48. The second depth range 46 includes the space beyond the user's hands 48. The second depth range is intended to capture the remainder of a room or spatial area. The distinction between the depth ranges may be a predetermined set value (e.g. an average user arm length), a determined learned value (e.g. a value assigned during an HMD calibration operation and based upon a given user's arm length), or a variably controlled value (e.g. the most recently calculated depth of the user's hands). In addition, each depth range may have a different field of vision. For example, the first depth range may have a 120 degree field of vision whereas the second depth range may have a 70 degree field of vision.

The second depth range 46 may include a wide variety of detected objects. Such objects can include inanimate objects 50 and animate objects 52 (e.g. people, animals, mobile machines, etc.). Frames may be captured in each of the depth ranges are variable rates. In some embodiments, frames in the second depth range 46 may be captured less frequently because in many circumstances, moving, animate objects 48, 52 will comprise a lesser percentage of the whole content of the second depth range 46 than in the first depth range 44 (which likely only comprises the user's hands). The use of depth contextual range and other ranges enable greater control of depth tracking frame rate and, in turn, power consumption.

In some embodiments of the technique introduced here, depth calculations are performed by calculating the phase delay ($\varphi$) between the emitted illumination and the return signal (reflected version of the emitted illumination). Phase delay is the difference (e.g., in degrees or radians) between the phase of the original waveform and the phase of the return signal. A known phase delay corresponds to a distance that is defined by a certain fraction of a signal frequency (f) divided by the speed of light. However, the phase delay of a signal is a repeating distance. A single computed phase delay value does not provide sufficient information to compute the distance to the object unambiguously, because it does not indicate how many phase repetitions are between the depth tracking system and the tracked object. This ambiguity is also known as phase aliasing. Use of a second frequency of the EM radiation enables de-aliasing calculations and provide an accurate depth based on the two (or more) phase measurements.

Figure 4:
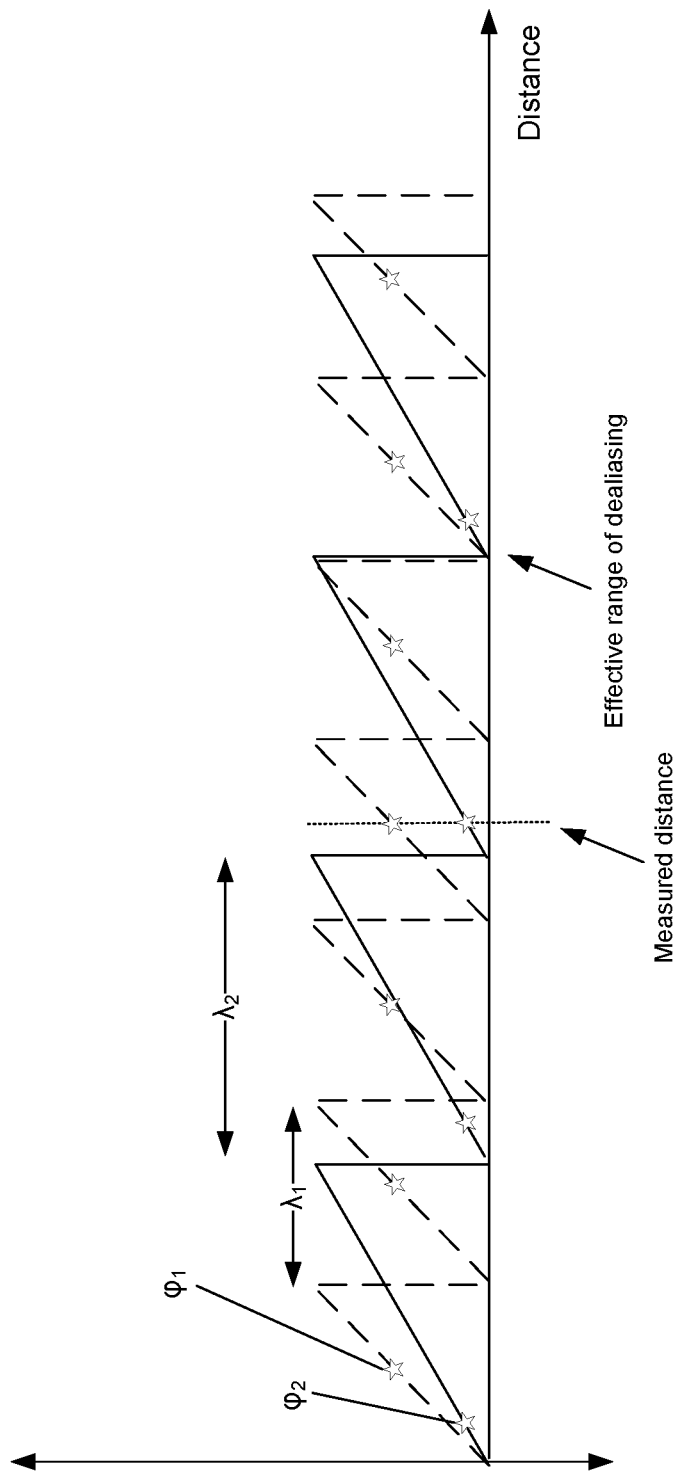
FIG. 4 is a graph illustrating depth calculation de-aliasing at two frequencies.

FIG. 4 is a graph illustrating depth calculation de-aliasing by computing phase at two different frequencies. In particular, FIG. 4 includes a graph of two frequencies. The horizontal axis of the graph tracks distance from the HMD device's illumination module. A first frequency is represented by a dashed line and has a first wavelength ($\Delta_1$). A second frequency is represented by a solid line and has a second wavelength ($\Delta_2$). Each frequency is emitted as part of the EM radiation with a phase of zero, at time zero. The phase delay of the return signal for each frequency is indicated by star icons. Each star icon is positioned at the same phase in each repetition of each frequency in the radiation.

Using only the phase delay of a single frequency, the depth tracking system can only be certain of the depth in terms of a number of distances indicated by the equation, $(\varphi_1/2\pi)(N)(f/c)=D$, where N is a number of phase wraps. Without additional information, one cannot solve for N. However, use of a second frequency, with a second measured phase delay, enables the depth tracking system to de-alias the measurements from the first frequency. The depth tracking system can solve for a matching distance between the two frequencies given their respective phase delays ($\varphi_1$ and $\varphi_2$). The resulting measured distance is defined as the distance where the two aliased depth distances provide a matching depth calculation, and is displayed on the FIG. 4 with a vertical, dotted line.

However, even with two frequencies, the phase will eventually repeat. The maximum unambiguous distance is defined as the distance where both signals reach their starting phase simultaneously. Thus, the least common multiple between the wavelengths of the first and second frequency is the maximum range of the depth tracking subsystem that can unambiguously determine the depth distance. The first and second frequency should be chosen based on the distance intended to be tracked, the accuracy requirements of the system, and the electrical constraints of the camera technology. For example, higher modulation frequencies provide greater depth resolution, but reduced aliasing range. For example, given a first depth range intended to track an depth tracking system user's hands, the effective range may be approximately 10 cm to 1 meter. For a second depth range intended for spatial mapping of a room or nearby real-world environment, the effective range may be 30 cm to approximately ten meters. For increased accuracy and ranging options of the de-aliasing, additional frequencies may be used in the EM radiation.

For each depth frame, there are a number of frequency captures. For each frequency capture there are a number of phase captures to determine the phase for that particular frequency.

Typically, each depth frame includes 2 or more frequency captures that are performed with as little time delay as possible. Time delay between the two frequency captures often results in motion blur either of the camera, or objects in the scene. This motion blur can then result in a miscalculation of the dealiasing, resulting in incorrect depth measurements. As two or more phase captures per frequency are required to capture the phase delay of that frequency measurement.

Figure 5:
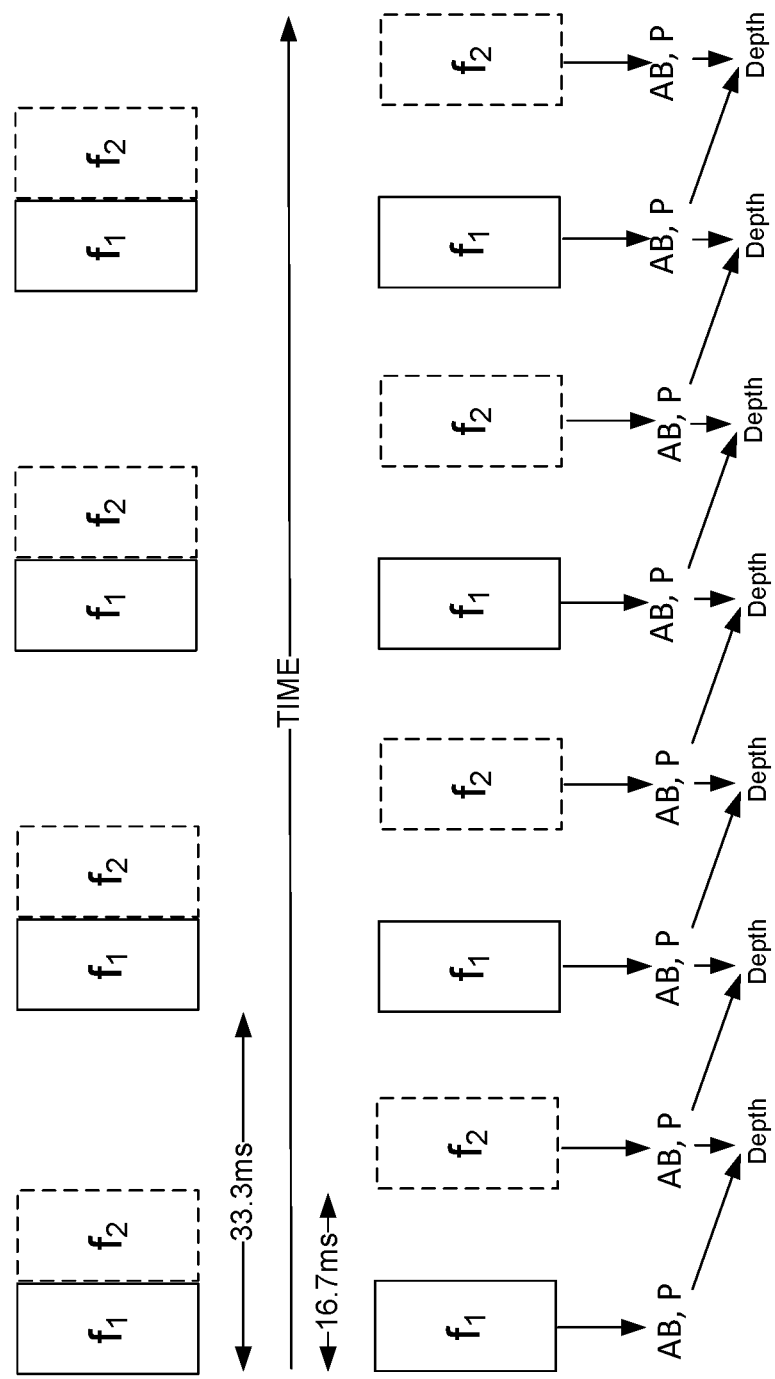
FIG. 5 is a block diagram illustrating a technique for doubling of depth tracking frame rate without increasing power consumption for the associated illumination.

FIG. 5 is a block diagram illustrating a technique for increasing the depth tracking frame rate without increasing the number of active camera frames. Blocks arranged horizontally in FIG. 5 represent frequency captures of the EM radiation emission pattern or signal. Two EM patterns are represented. The upper EM pattern represents an EM pattern with substantially concurrent emissions of each frequency. The lower EM pattern represents an EM pattern with alternating, equally spaced frequency captures. Each frequency capture contributes to the at least two used for a depth frame.

Using the upper EM pattern, to double the frame rate of the depth tracking (e.g., from 30 Hz to 60 Hz), there needs to be twice as many frequency captures. Conversely, the lower EM pattern has twice the frame rate of the upper EM pattern using the same number of frequency captures. From each frequency capture (either f1 or f2), the depth tracking system is able to determine an active brightness (AB), and a phase (P). Using a single phase delay, the depth tracking system may determine an ambiguous depth. As discussed with reference to FIG. 4, however, phase delays computed from return signals at two frequencies enable calculation of an unambiguous depth. In order to calculate depth, the upper EM pattern uses phase captures from frequency captures during substantially concurrent frames (a set from each frequency), whereas the lower EM pattern uses phase captures from a current frequency capture and the immediately preceding frequency captures to generate a depth frame.

The lower EM pattern provides significant performance benefits, but suffers from some drawbacks. In a dynamic environment (i.e., an environment including one or more moving objects), there are certain regions in the depth image that may suffer from motion blur. For example, the same pixel location may observe a background depth in one frequency capture and foreground depth in another frequency capture, which results in motion artifacts. Motion artifacts include incorrect phase estimations, incorrect dealiasing, and a incorrect calculated depth values.

The motion artifacts are detectable because the pixel will show different signal magnitude (as also called active brightness) in each of the two frequency captures. To correct the drawbacks of the lower EM pattern, the depth tracking system may apply a threshold on the ratio of the two active brightness values to detect the pixels indicative of motion. After detection, the depth tracking system may invalidate those pixels to avoid reporting erroneous depth.

The pixel invalidation method works well for real-world environments with moderate amounts of motion. Where there is a high frame rate, the motion blur will be comparatively small. The increased frame rate of the lower EM pattern in FIG. 5 thereby reduces the severity of the motion artifact issue. In applications where pixel invalidation is not adequate for desired levels of accuracy, the depth tracking system may take additional motion related error correction steps.

One such possible step includes the use of a connected component on the current frame. For each pixel that suffers from motion blur, the depth tracking system only uses the current frequency frame and measured phase. The previous frame including the other frequency is ignored. Rather, the depth tracking system chooses a de-aliasing range that results in the least depth discontinuity with neighboring or connected pixels that do not have motion blur.

In some applications such as hand tracking, there are high levels of semantic information such as a 3D hand location from the previous frame. The information of that previous frame (or previous frames) can inform the de-aliasing algorithm in order to figure out the de-aliasing range in motion blurred pixels.

Figure 6:
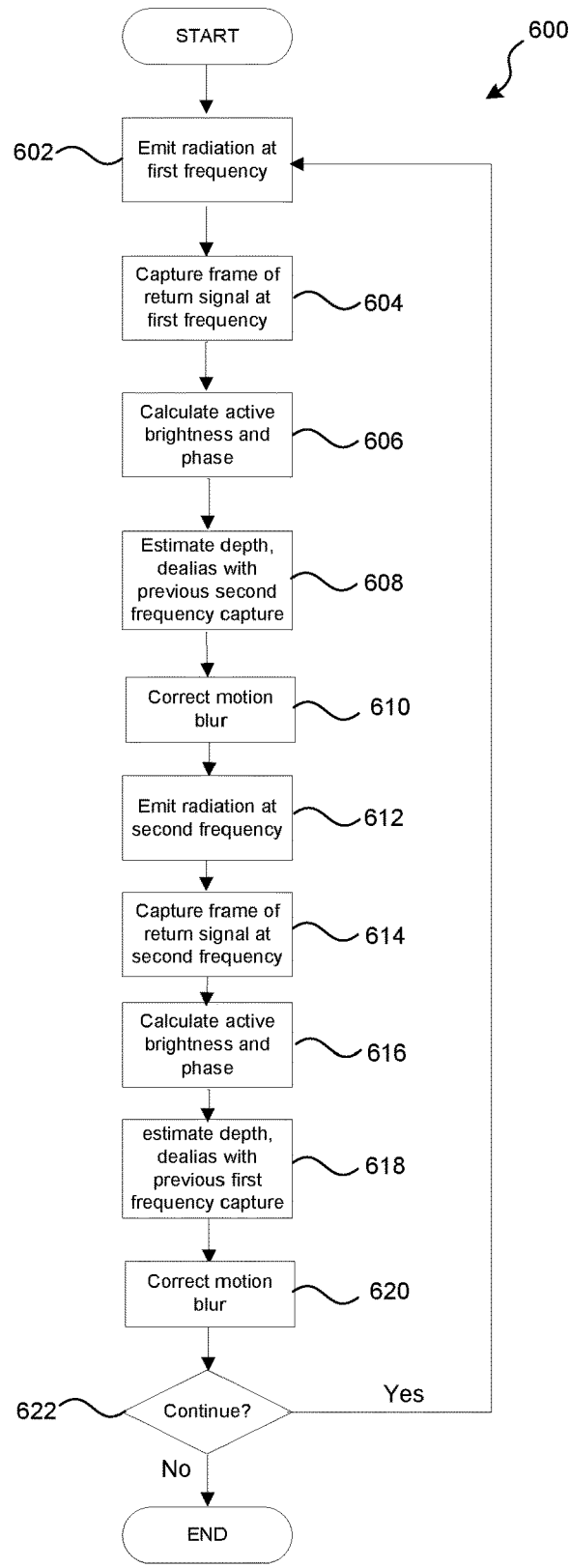
FIG. 6 is a flow chart illustrating a technique for doubling of depth tracking frame rate without increasing the number of radiation emissions.

FIG. 6 is a flow chart illustrating a technique of doubling of depth tracking frame rate without increasing the number of radiation emissions. The flowchart of FIG. 6 illustrates the method improving depth tracking frame rate of the lower EM pattern of FIG. 5.

In step 602, the illumination module emits radiation at the first frequency. The emission travels away from the depth tracking system and reflects off objects. Reflections return to the depth tracking system. In step 604, the depth camera captures the return signal of the first frequency. The return signal is captured on a pixel-by-pixel basis for the current frame. In step 606, the depth tracking system calculates the active brightness, and phase of the returned first frequency for the current frame. The depth tracking system compares the phase of the returned first frequency to the emitted phase to calculate a phase delay. Details of step 606 are discussed in further detail below in relation to FIG. 8.

In step 608, the depth tracking system calculates an estimated depth based on the phase delay and the wavelength of the first frequency. Where there is a previous frame with comparable data regarding the second frequency, the depth tracking system de-aliases the ambiguous depth of the frames captured in step 604 to compute an disambiguated depth. At this point in the method, the most recently captured frame is of the first frequency. In step 610, the depth tracking system corrects motion blur or motion artifacts, using, for example, one of the techniques discussed above. Correction of motion blur occurs when there is a previous frequency capture. Where the system receives a first frequency capture, this step is skipped.

In step 612, the illumination module emits radiation at a second frequency. In step 614, the depth camera captures the return signal of the second frequency. The return signal of the second frequency is also captured on a pixel-by-pixel basis. In step 616, the depth tracking system calculates the active brightness, and phase of the returned second frequency. The depth tracking system compares the phase of the returned first frequency to the emitted phase to calculate a phase delay. Details of step 616 are discussed in further detail below in relation to FIG. 8.

In step 618, the depth tracking system calculates depth using the second frequency capture and the first frequency frame to disambiguate depth. Calculations for the ambiguous depth are based on the phase delay and the wavelength of the second frequency. Comparatively to step 608, the depth tracking system de-aliases the ambiguous depth of the frames captured in step 612 to generate the disambiguated depth. In step 616, the most recently captured frame is of the second frequency.

In step 620, the depth tracking system corrects motion blur or motion artifacts, using, for example, one of the techniques discussed above. Steps 608 and 618 of the method have the potential to introduce additional error. The error may originate from the fact that the de-aliasing is performed using frames captured at perceptibly different times. Where error exists, the ambiguous distances estimated may not match perfectly. In some embodiments, imperfect matches may be compensated for by using error thresholds and pixel invalidation. In some embodiments, imperfect matches are corrected by using the de-aliasing range that causes the least depth discontinuity with neighboring or connected pixels that do not have motion blur. In some embodiments, imperfect matches may be compensated for by using acceleration vectors from past frames of the object. Assuming consistent motion or consistent acceleration in a direction, the depth tracking system may use estimates of the object's location to error correct.

In step 622, the method and depth tracking continues while the depth tracking system is in operation. Where the operation continues, the frame captured in step 614 is recycled into step 608, and the method loops until the device is no longer in use. This method may be altered to include additional frequencies, such as a third frequency. In this way, each of the used frequencies in the set of frequencies is alternately rotated into use for each depth frame.

Figures 7A, 7B:
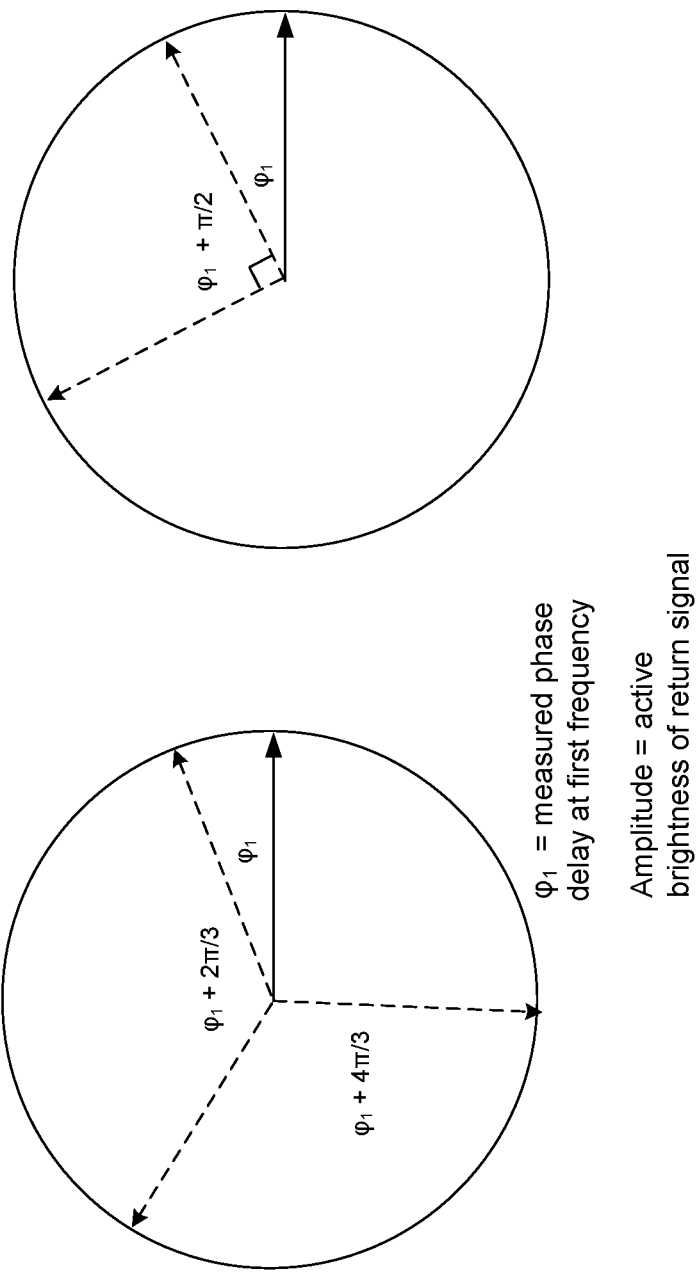
FIG. 7A is a graphic illustration of the use of three phase measurements of return radiation to verify phase delay.
FIG. 7B is a graphic illustration of the use of two phase measurements of return radiation to verify phase delay.

FIGS. 7A and 7B are graphic illustrations of the performance of both three and two phase captures respectively of a single frequency capture from return radiation to determine phase delay. In order to error check the depth camera's capture of the phase delay of the return signal, multiple samples are taken at different phases. FIGS. 7A and 7B each illustrate a different method of measuring the phase delay for a given frequency capture of the EM radiation.

Traversing 360 degrees or $2\pi$ radians of the circle comprises one phase wrap. The radius of the circle is the amplitude (active brightness) of the EM radiation. The solid line indicates the starting phase of the EM radiation. Traversing counter-clockwise, the angle between the starting phase and the first dashed line indicates the size of the phase delay ($\varphi$). The subsequent dashed lines indicate where additional phase delay captures at a given frequency are taken to determine the phase for the frequency capture. Once all samples are taken, the depth tracking system solves for $\varphi$ based on those observations.

Specifically in FIG. 7A, there are three measurements. In some embodiments, each measurement is taken at a starting phase 120 degrees or $2\pi/3$ radians apart. Once the phase measurements are taken, the depth tracking system may solve for the phase delay ($\varphi$). If the phase delay remains consistent across all measurements, the circle is solved correctly without error.

To estimate phase at a single frequency to with three phase captures involves a number of equations for the phase, p. For instance, using $p=2\pi n/N$, $n=0, 1, \ldots, N-1$. Where $N=3$, the depth camera provides the following three observation samples:

$$I_0 = c(p = 0) = A\cos(\varphi) \qquad (1)$$

$$I_1 = c\left(p = \frac{2\pi}{3}\right) = A\cos\left(\varphi + \frac{2\pi}{3}\right) \qquad (2)$$

$$I_2 = c\left(p = \frac{4\pi}{3}\right) = A\cos\left(\varphi + \frac{4\pi}{3}\right)$$

The phase is estimated by taking a discrete Fourier transform at the fundamental frequency $$X_1 = \sum_{n=0}^{2} I_n * e^{2\pi i n/N}$$

The above equation uses the Euler form and includes a real and imaginary component and the phase can be obtained by:

$$\phi = \operatorname{atan}\frac{\operatorname{Im}(X_1)}{\operatorname{Re}(X_1)}$$

Referring to FIG. 7B, there are only two phase captures taken. The calculations of FIG. 7A uses 3 equally spaced samples. If two equally spaced samples are taken (e.g. 180 degrees or $\pi/2$ radians apart), the samples would cancel each other out. In some embodiments, the second capture is taken at a starting phase that is not 180 degrees (e.g., 90 degrees or $\pi/2$ radians, or between 45 and 135 degrees) from the first measurement. Taking only 2 phase captures reduces the power consumption of the depth camera and the memory used for depth measurements. The circle is solved for similarly, though using different mathematical equations.

The new equations expand equations 1 and 2 from FIG. 7A using trigonometric identities:

$$I_0 = A\cos(\phi+p) = A(\cos(\phi)\cos(p)-\sin(\phi)\sin(p))$$

$$I_1 = A\cos(\phi+90+p) = A(\cos(\phi)\cos(90+p)-\sin(\phi)\sin(90+p))$$

Using both imaginary and real numbers, the equations simplify to:

$$x = A\cos(\phi), \ y = A\sin(\phi)$$

$$I_0 = x\cos(p) - y\sin(p))$$

$$I_1 = x\cos(p+90) - y\sin(p+90)$$

Finally, The depth tracking system solves for X and Y via elimination:

$$x = \frac{\sin(p+90)I_0 - \sin(p)I_1}{\sin 90}$$

$$y = \frac{\cos(p+90)I_0 - \cos(p)I_1}{\sin 90}$$

$$\phi = \operatorname{atan}\frac{y}{x}$$

Choice of the two phase capture measurements can be arbitrary as long as they are not collinear. However, in some embodiments, 90 degrees obtains an optimal signal to noise ratio when two phase captures are used.

Figure 8:
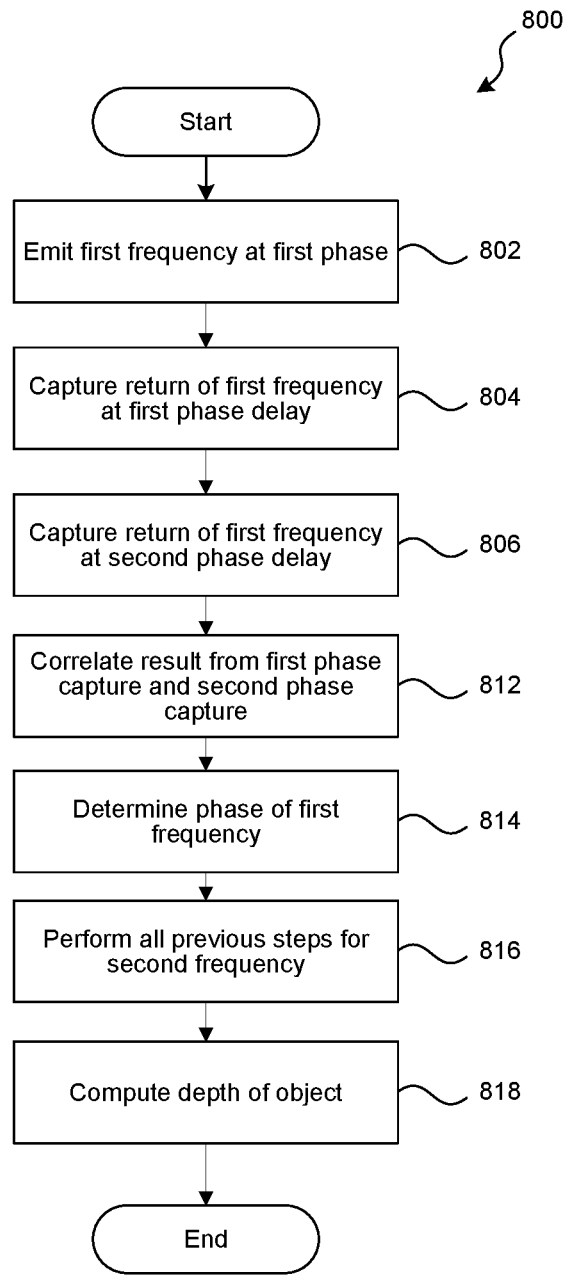
FIG. 8 is a flow chart illustrating the use of two phase measurements of return radiation to verify phase delay.

FIG. 8 is a flow chart illustrating the use of two phase captures of a single frequency capture from returned radiation to determine phase delay. In step 802, the illumination module emits radiation at a first frequency and a first phase. The emission travels away from the depth tracking system and reflects off objects. In step 804, the depth camera captures the reflected radiation at the first frequency, at a first phase delay. The first phase delay is as observed by the depth camera. The shutter speed is configured to match the first frequency.

In step 806, the depth camera takes the second phase capture at the first frequency, at a second phase delay. The second phase capture is at a phase other than 180 degrees or π radians from the first capture phase. In some embodiments, the second capture phase is 90 degrees, or π/2 radians later than the first emission phase. Where the sensor is without error, the second phase delay is the same as the first phase delay, as measured from step 804.

In step 808, the depth tracking system correlates the data points collected in steps 804 and 806. In step 810, the depth tracking system solves for the phase delay (φ) using both of the data points of steps 804 and 806. In step 812, each of steps 802 through 810 is repeated with reference to the second frequency capture: an emission, two phase captures, and processing of the phase capture data. In step 816, the depth tracking system uses the computed phase delay of the first frequency ($\varphi_1$) and the computed phase delay of the second frequency ($\varphi_2$) to compute the depth of the object.

Figure 9:
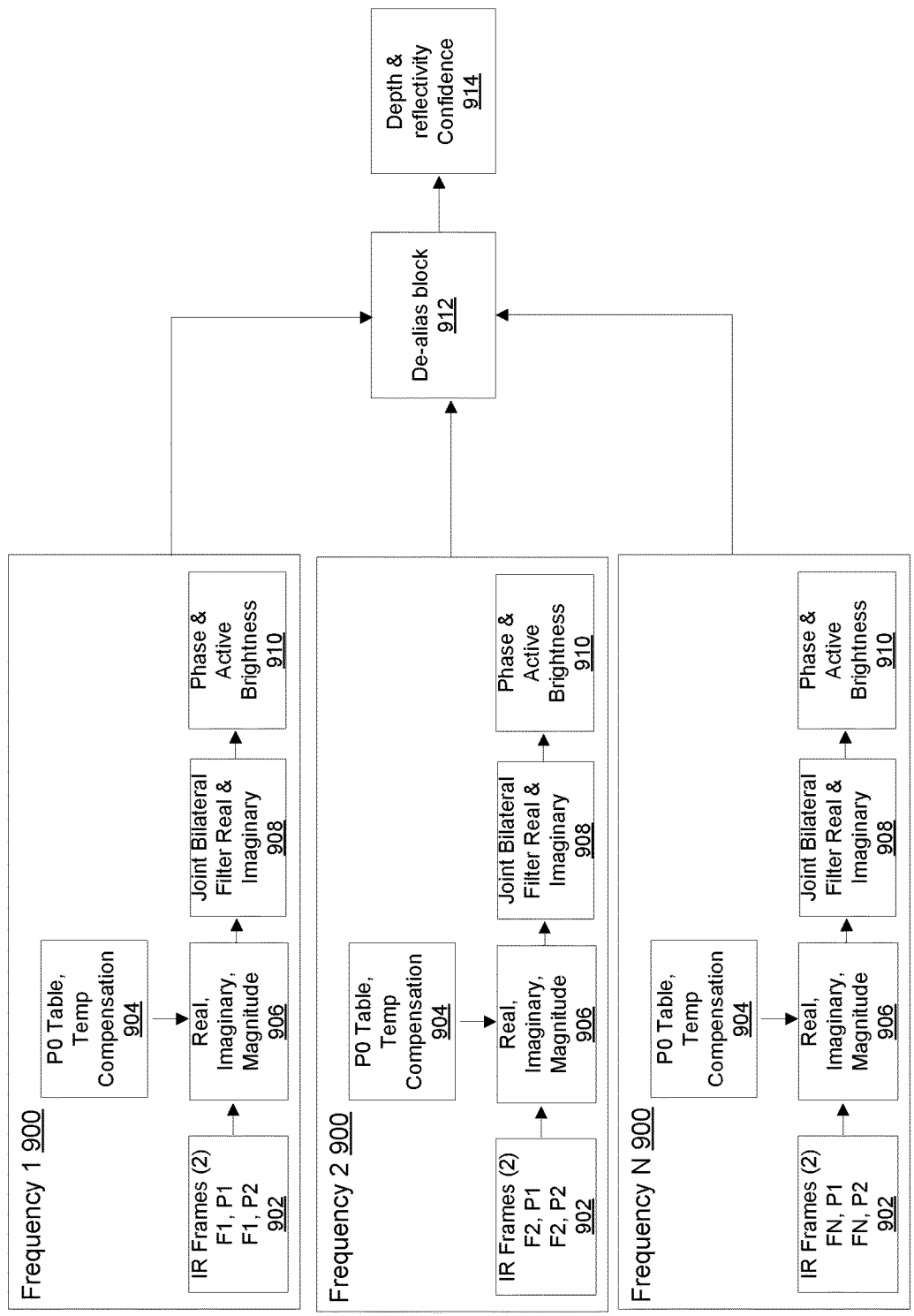
FIG. 9 is a block diagram of logical elements of a depth tracking system.

FIG. 9 is a block diagram of logical elements of a depth tracking system. The depth tracking system uses at least two frequencies. The frequencies are used to de-alias one another. The use of additional frequencies contribute to additional accuracy of the de-aliasing process.

Shown in logic block 902, for each frequency capture, in each depth frame, of each pixel, the depth sensing system takes two phase captures of the return radiation. Each phase capture is at a different phase. Shown in logical block 904, the depth sensing system substitutes a table to provide calibration correction values to the system, and constants for equations based on ambient temperature into mathematical equations.

Shown in logical block 906, using the output of logical steps 902 and 904, the depth sensing system completes equations of complex numbers and calculates the magnitude of the return signal. In logical step 908, the equations of complex numbers are simplified and solved. In logical step 910, the depth system has an output of a phase and an active brightness of the return signal.

Shown in logical block 912, the depth sensing system uses the output from each frequency to de-alias the depth measurement to determine an unambiguous distance to an object. Logical block 914 is the output of the depth sensing system. For each pixel in each depth determination frame, the output is a depth and a reflectivity. The reflectivity is calculated from the active brightness compared to the ambient brightness.

An Example Machine Overview

The machine-implemented operations described above can be implemented at least partially by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the embodiments introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Figure 10:
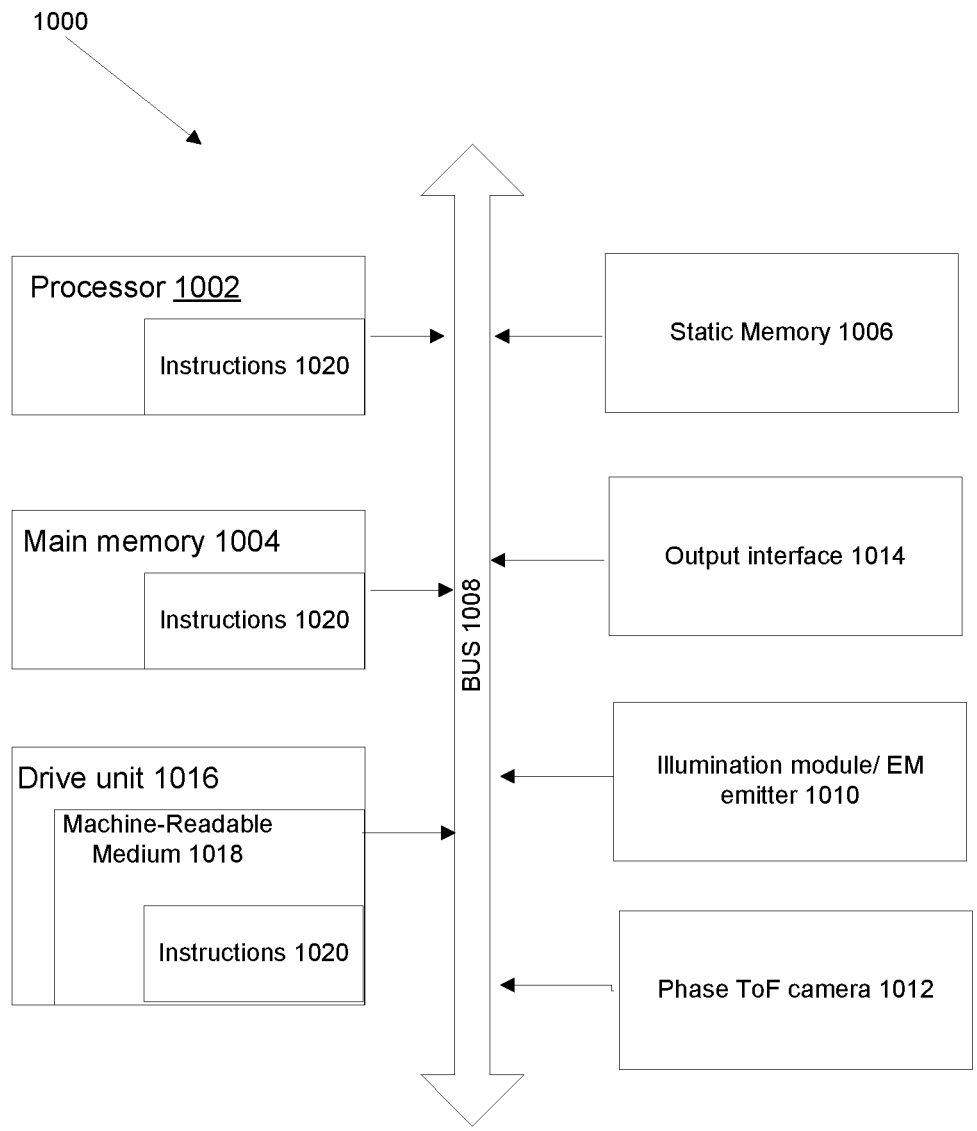
FIG. 10 is a block schematic diagram of a system in the exemplary form of a computer system within which a set of instructions for causing the system to perform any one of the foregoing methodologies and logical flows may be executed.

FIG. 10 is a block schematic diagram of a system in the exemplary form of a computer system 1000 within which a set of instructions for causing the system to perform any one of the foregoing methodologies and logical flows may be executed. In alternative embodiments.

The computer system 1000 includes a processor 1002, a main memory 1004 and a static memory 1006, which communicate with each other via a bus 1008. The computer system 1000 further includes an illumination module 1010 and a phase ToF camera 1012. The computer system 1000 also includes an output interface 1014, for example, a USB interface, a network interface, or electrical signal connections and/or contacts.

The disk drive unit 1016 includes a machine-readable medium 1018 on which is stored a set of executable instructions, i.e. software 1020, embodying any one, or all, of the methodologies described herein. The software 1020 is also shown to reside, completely or at least partially, within the main memory 1004 and/or within the processor 1002. The software 1020 may further be transmitted or received over a network by means of a network interface device 1014.

In contrast to the system 1000 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to access real-time video delivery on such internet-enabled or other network-enabled devices, servers, or clients in accordance with embodiments herein. It further should be appreciated that one or more cloud computing embodiments include real-time video delivery using mobile devices, tablets, and the like, as such devices are becoming standard consumer devices.

Examples of Certain Embodiments

1. A method comprising: transmitting an electromagnetic signal over a wireless medium; detecting a returned signal that is a reflected version of the transmitted electromagnetic signal, reflected by an object; correlating the returned signal with a reference signal at each of only two sampling phases that are not 180 degrees apart; determining a phase of the returned signal based on a result of the correlating; and determining a distance to the object based on the determined phase of the returned signal.

2. The method of example 1, wherein the electromagnetic signal comprises infrared light.

3. The method of example 1 or example 2, wherein the sampling phases are between 45 and 135 degrees apart.

4. The method of any of examples 1 to 3, said transmitting an electromagnetic signal step wherein, the electromagnetic signal includes a plurality of frequencies over a time period that includes a plurality of frames for capturing distance information, wherein the plurality of frames are equally spaced in time, including transmitting the electromagnetic signal over only one of the plurality of frequencies during each frame of the plurality of frames so as to rotate between the frequencies of the plurality of frequencies for each set of consecutive frames in the plurality of frames.

5. The method of any of examples 1 to 4, further comprising: computing a first phase value during a first frame of the plurality of frames, based on a first frequency of the plurality of frequencies; computing a second phase value during a second frame of the plurality of frames, based on a second frequency of the plurality of frequencies, the second frame immediately following the first frame; and computing a preliminary distance to the object for the second frame based on the second phase value; and computing a distance to the object for the second frame by performing de-aliasing using the first phase value and the second phase value.

6. The method of any of examples 1 to 5, wherein the electromagnetic signal has an effective de-aliasing range based on least common multiple of a first wavelength of a first frequency of the two frequencies and a second wavelength of a second frequency of the two frequencies.

7. The method of any of examples 1 to 6, wherein the method is performed by a time of flight sensor and the object is a user's hand.

8. A system comprising: an electromagnetic ("EM") emitter configured to transmit an electromagnetic signal over a wireless medium; a time-of-flight (ToF) sensor configured to detect a returned signal that is a reflected version of the transmitted electromagnetic signal, reflected by an object, the depth camera further configured to generate only two sampling frames, each with a respective sampling phase that are not 180 degrees apart; and a processor with instructions to correlate the detected return signal to the two sampling frames in order to determine a phase of the returned signal and determine a distance to the object based on the determined phase of the returned signal.

9. The system of example 8, wherein the electromagnetic signal comprises infrared light.

10. The system of any of examples 8 to 9, wherein the system is arranged as a single apparatus, the apparatus further comprising: a housing shaped to allow the device to be worn on a user's head.

11. The system of any of examples 8 to 10, further comprising: a camera module mounted on a front of the housing and including mountings for the EM emitter and the ToF sensor.

12. The system of any of examples 8 to 11, wherein the ToF sensor has a field of view characterized by a 70 degree or greater cone.

13. A method of phase time-of-flight (PToF) distance determination, the method comprising: transmitting an infrared (IR) signal at each of a plurality of different frequencies; for each of the plurality of different frequencies, detecting, by a PToF sensor, a returned IR signal that is a reflected version of the transmitted IR signal, reflected by an object, determining a phase of the returned IR signal by correlating the returned signal with a reference signal at each of only two sampling phases that are not 180 degrees apart, and determining a phase of the returned signal based on a result of the correlating; and determining a disambiguated distance to the object based on the determined phase of the returned signal for each of the plurality of different frequencies.

14. The method of example 13, wherein the sampling phases are between 45 and 135 degrees apart.

15. The method of example 13 or example 14, said transmitting an electromagnetic signal step wherein, the plurality of different frequencies includes exactly two frequencies over a time period that includes a plurality of frames for capturing distance information, including transmitting the electromagnetic signal over only one of the two frequencies during each frame of the plurality of frames so as to alternate between the two frequencies for each pair of consecutive frames in the plurality of frames.

16. The method of any of examples 1 to 15, further comprising:

computing a first phase value during a first frame of the plurality of frames, based on a first frequency of the two frequencies; computing a second phase value during a second frame of the plurality of frames, based on a second frequency of the two frequencies, the second frame immediately following the first frame; and computing a preliminary distance to the object for the second frame based on the second phase value; and computing a distance to the object for the second frame by performing de-aliasing using the first phase value and the second phase value.

17. The method of any of examples 13 to 16, wherein the electromagnetic signal has an effective de-aliasing range based on least common multiple of a first wavelength of a first frequency of the two frequencies and a second wavelength of a second frequency of the two frequencies.

18. The method of any of examples 13 to 17, wherein said computing the distance to the object, further comprises: computing the distance to fingers on the hand that are visible to the near-eye display device.

19. The method of any of examples 13 to 18, wherein said computing a distance to the object for the second frame is computed on a pixel-by-pixel basis for the second frame.

20. The method of any of examples 13 to 19, further comprising: detecting motion blur based on the computed distance to the object for the second frame as dealiased by the first frame; and performing corrective action on the computed distance to reduce motion blur.

What is claimed is:

1. A method comprising:
    transmitting an electromagnetic signal over a wireless medium, wherein the electromagnetic signal includes a plurality of frequencies over a time period that includes a plurality of frames for capturing distance information, wherein the plurality of frames are equally spaced in time, including transmitting the electromagnetic signal over only one of the plurality of frequencies during each frame of the plurality of frames so as to rotate between the frequencies of the plurality of frequencies for each set of consecutive frames in the plurality of frames;
    detecting a returned signal that is a reflected version of the transmitted electromagnetic signal, reflected by an object;
    correlating the returned signal with a reference signal at each of only two sampling phases that are not 180 degrees apart;
    determining a phase of the returned signal based on a result of the correlating; and
    determining a distance to the object based on the determined phase of the returned signal.

2. The method of claim 1, wherein the electromagnetic signal comprises infrared light.

3. The method of claim 1, wherein the sampling phases are between >45 and 135 degrees apart.

4. The method of claim 1, further comprising:
    computing a first phase value during a first frame of the plurality of frames, based on a first frequency of the plurality of frequencies;
    computing a second phase value during a second frame of the plurality of frames, based on a second frequency of the plurality of frequencies, the second frame immediately following the first frame; and
    computing a preliminary distance to the object for the second frame based on the second phase value; and
    computing a distance to the object for the second frame by performing de-aliasing using the first phase value and the second phase value.

5. The method of claim 4, wherein the electromagnetic signal has an effective de-aliasing range based on least common multiple of a first wavelength of a first frequency of the two frequencies and a second wavelength of a second frequency of the two frequencies.

6. The method of claim 1, wherein the method is performed by a time of flight sensor and the object is a user's hand.

7. A system comprising:
    an electromagnetic ("EM") emitter configured to transmit an electromagnetic signal over a wireless medium, wherein the electromagnetic signal includes a plurality of frequencies over a time period that includes a plurality of frames for capturing distance information, wherein the plurality of frames are equally spaced in time, including transmitting the electromagnetic signal over only one of the plurality of frequencies during each frame of the plurality of frames so as to rotate between the frequencies of the plurality of frequencies for each set of consecutive frames in the plurality of frames;
    a time-of-flight (ToF) sensor configured to detect a returned signal that is a reflected version of the transmitted electromagnetic signal, reflected by an object, the depth camera further configured to generate only two sampling frames, each with a respective sampling phase that are not 180 degrees apart; and
    a processor with instructions to correlate the detected return signal to the two sampling, frames in order to determine a phase of the returned signal and determine a distance to the object based on the determined phase of the returned signal.

8. The device of claim 7, wherein the electromagnetic signal comprises infrared light.

9. The system of claim 7, wherein the system is arranged as a single apparatus, the apparatus further comprising:
    a housing shaped to allow the device to be worn on a user's head.

10. The apparatus of claim 9, further comprising:
    a camera module mounted on a front of the housing and including mountings for the EM emitter and the ToF sensor.

11. The device of claim 7, wherein the ToF sensor has a field of view characterized by a 70 degree or greater cone.

12. A method of phase time-of-flight (PToF) distance determination, the method comprising:
    transmitting an infrared (IR) signal at each of a plurality of different frequencies, wherein, the plurality of different frequencies includes exactly two frequencies over a time period that includes a plurality of frames for capturing distance information, including transmitting an electromagnetic signal over only one of the two frequencies during each frame of the plurality of frames so as to alternate between the two frequencies for each pair of consecutive frames in the plurality of frames;
    for each of the plurality of different frequencies,
        detecting, by a PToF sensor, a returned IR signal that is a reflected version of the transmitted IR signal, reflected by an object,
        determining a phase of the returned IR signal by correlating the returned signal with a reference signal at each of only two sampling phases that are not 180 degrees apart, and
        determining a phase of the returned signal based on a result of the correlating; and
    determining a disambiguated distance to the object based on the determined phase of the returned signal for each of the plurality of different frequencies.

13. The method of claim 12, wherein the sampling phases are between 45 and 135 degrees apart.

14. The method of claim 12, further comprising:
    computing a first phase value during a first frame of the plurality of frames, based on a first frequency of the two frequencies;
    computing a second phase value during a second frame of the plurality of frames, based on a second frequency of the two frequencies, the second frame immediately following the first frame; and computing a preliminary distance to the object for the second frame based on the second phase value; and computing a distance to the object for the second frame by performing de-aliasing using the first phase value and the second phase value.

15. The method of claim 14, wherein the electromagnetic signal has an effective de-aliasing range based on least common multiple of a first wavelength of a first frequency of the two frequencies and a second wavelength of a second frequency of the two frequencies.

16. The method of claim 15, wherein computing the distance to the object further comprises:
computing the distance to fingers on the hand that are visible to the near-eye display device.

17. The method of claim 12, wherein computing the distance to the object for the second frame is computed on a pixel-by-pixel basis for the second frame.

18. The method of claim 12, further comprising:
detecting motion blur based on the computed distance to the object for the second frame as dealiased by the first frame; and performing corrective action on the computed distance to reduce motion blur.

* * * * *